United States Patent [19]
Bonnefous et al.

[11] Patent Number: 6,089,255
[45] Date of Patent: Jul. 18, 2000

[54] VALVE WITH INFLATABLE MEMBRANE

[75] Inventors: Jean Bonnefous, Reze; Bruno Maraud, Basse Goulaine; Thierry Picot, Mouzillon, all of France

[73] Assignee: S.A. Defontaine, France

[21] Appl. No.: 09/294,673

[22] Filed: Apr. 19, 1999

[30] Foreign Application Priority Data

Apr. 21, 1998 [FR] France ..................... 9804974
Jun. 30, 1998 [FR] France ..................... 9808330

[51] Int. Cl.$^7$ ............ F16K 11/20; F16K 31/124; B08B 9/032
[52] U.S. Cl. ............ 137/312; 137/240; 137/614.18; 251/63.5; 251/63.6
[58] Field of Search .................... 137/240, 312, 137/614.16, 614.17, 614.18, 614.19; 251/63.5, 63.6

[56] References Cited

U.S. PATENT DOCUMENTS

| | | | |
|---|---|---|---|
| 2,705,016 | 3/1955 | Saar | 137/240 |
| 4,254,792 | 3/1981 | Schadel | 137/614.16 |
| 4,292,992 | 10/1981 | Bhide' | 137/240 |
| 4,360,039 | 11/1982 | Jeppsson | 137/240 |
| 4,522,223 | 6/1985 | Balsys et al. | 137/240 |

FOREIGN PATENT DOCUMENTS

| | | |
|---|---|---|
| 0545846 | 9/1993 | European Pat. Off. . |
| 2818787 | 8/1979 | Germany . |
| 3017084 | 5/1981 | Germany . |
| 2064724 | 6/1981 | United Kingdom . |

*Primary Examiner*—George L. Walton
*Attorney, Agent, or Firm*—Harness, Dickey & Pierce, P.L.C.

[57] ABSTRACT

A valve comprises a body including a chamber and two superposed closures moving in the chamber and the bottom part of the chamber includes a first seat for one closure and a second seat for the other closure. The closures are each carried by a swing mobile between a position in which the closure bears in sealed fashion on the corresponding seat and a position in which the closure is spaced from the seat. The space between the two closures contains an elastic material membrane closing a chamber into which a compressed air feed discharges. The membrane can therefore be inflated and pressed in sealed fashion onto the top closure to close and seal the inlet of a passage which discharges into a space between the two closures.

15 Claims, 4 Drawing Sheets

6,089,255

VALVE WITH INFLATABLE MEMBRANE

BACKGROUND OF THE INVENTION

FIELD OF THE INVENTION

The invention concerns a double-closure valve.

We have created a valve comprising a body including a chamber communicating with two lateral conduits. Two superposed closures are mobile in said chamber along a common axis perpendicular to the two lateral conduits. The lower part of the chamber includes a first seat for the top closure and a second seat for the bottom closure below the first seat.

The valve body incorporates a second chamber under the aforementioned two seats and into which a third conduit discharges. The closures are each carried by a swing mobile between a position in which the closure bears in a sealed manner on the corresponding seat and a position in which the closure is spaced from said seat. The swing of the bottom closure incorporates an internal passage that discharges into a space between the two closures.

The two closures can be moved independently of each other, each with its own range of movement, to clean the valve.

The internal passage in the swing of the bottom closure enables the cleaning liquid to be drained off to a collector.

The above valve has the following drawback:

When the two closures are in the closed position bearing on their seat, there is a space between the two seats that communicates with the passage in the swing of the bottom closure.

This space disappears when the closures are open. However, for a very short time period before the closures reach their fully open position the space between the two closures is in communication with the aforementioned passage.

As a result the liquid passing through the valve can leak via the above passage.

The aim of the present invention is to remedy the above drawback by fitting the valve with means for preventing liquid leaking via the aforementioned passage when the closures move from their closed position toward their open position.

SUMMARY OF THE INVENTION

The invention consists in a valve comprising a body including a chamber communicating with two lateral conduits and two superposed closures mobile in the chamber along a common axis perpendicular to the two lateral conduits, wherein a lower part of the chamber includes a first seat for the top closure and a second seat for the bottom closure below the first seat, the valve body incorporates a second chamber under the aforementioned two seats and into which a third conduit discharges, the closures are each carried by a swing mobile between a position in which the closure bears in a sealed manner on the corresponding seat and a position in which the closure is spaced from the seat, the swing of the bottom closure incorporates an internal passage that discharges into a space between the two closures, and the space between the two closures contains an elastic material membrane closing a chamber into which a compressed air feed discharges so that the membrane can be inflated and applied in a sealed fashion to the bottom closure to close and seal the inlet of the passage.

Accordingly, to prevent liquid leaking during movement of the closures toward the open position, it is sufficient to inject compressed air into the chamber between the two closures to inflate the membrane and provide the required seal.

In an advantageous version of the invention, the chamber closed by the elastic membrane is in a bottom surface of the top closure and at least one end of the membrane is fixed to the top closure.

In a first version of the invention, the two ends of the membrane carry talons engaged in grooves.

In another version of the invention, one end of the membrane is fixed to the swing of the bottom closure near its top surface.

The compressed air feed that discharges into the chamber closed by the membrane is preferably connected to an axial passage in the swing of the bottom closure.

The closures are preferably held in a closed position bearing on the corresponding seat by springs bearing on the top ends of the swings of the closures, the top end of the swing of the bottom closure carrying a piston mobile in a cylindrical chamber, a compressed air feed being provided in a space under the piston to move it toward the open position of the closures.

Other features and advantages of the invention will become more apparent in the following description.

BRIEF DESCRIPTION OF THE DRAWINGS

In the accompanying drawings, which are provided by way of non-limiting example.

DETAILED DESCRIPTION OF THE PREFERRED EMBODIMENTS

Figure 1:
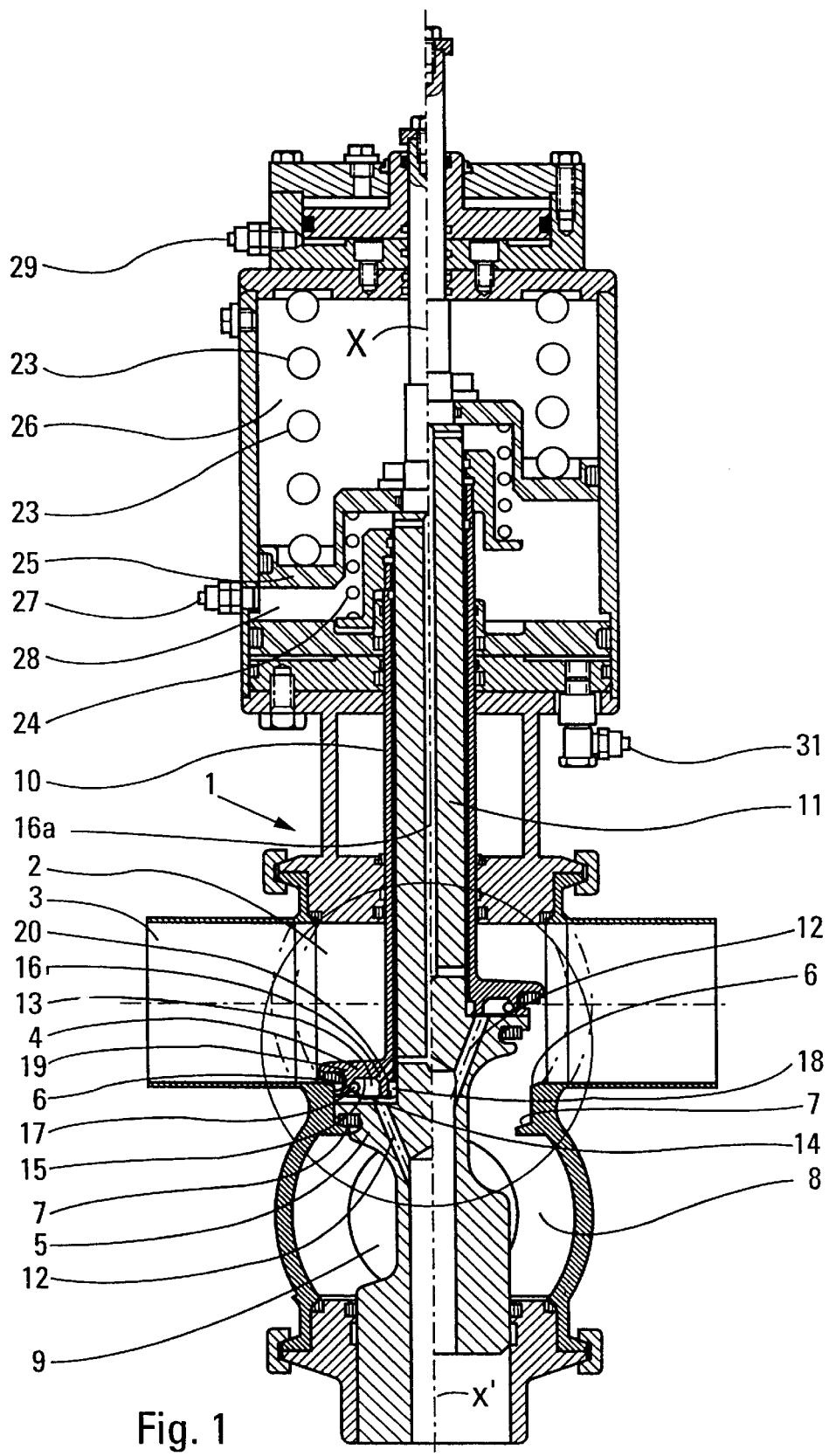
FIG. 1 is a view in axial section of a valve in accordance with the invention equipped with a first version of the inflatable membrane.

In the FIG. 1 embodiment, the valve comprises a body 1 including a chamber 2 communicating with two lateral conduits 3.

Two superposed closures 4, 5 are mobile in the chamber 2 along a common axis X–X' perpendicular to the two lateral conduits 3.

The bottom part of the chamber 2 includes a first seat 6 for the top closure 4 and a second seat 7 for the bottom closure 5 below the first seat 6.

The body 1 of the valve further includes a second chamber 8 under the aforementioned two seats 6, 7 and into which a third conduit 9 discharges.

The closures 4, 5 are each carried by a swing 10, 11 mobile between a position in which the closure 4, 5 bears in sealed fashion on the corresponding seat 6, 7 (see the lefthand part of FIG. 1) and a position in which the closure is spaced from said seat (see the righthand part of FIG. 1).

FIG. 1 also shows that the swing 11 of the bottom closure 5 includes an internal passage 12 that discharges into a space 13 between the two closures 4, 5.

In accordance with the invention, the space 13 between the two closures 4, 5 contains an elastic material membrane 14 closing a chamber 15 into which a compressed air feed 16 discharges so that the membrane 14 can be inflated and pressed in a sealed fashion onto the bottom closure 5 to close and seal the entry of the passage 12, as shown in the righthand part of FIG. 1.

FIG. 1 also shows that the chamber 15 closed by the elastic membrane 14 is formed in the bottom surface of the top closure 4 and that one end of the membrane 14 is fixed to the top closure 4.

The two ends of the membrane 14 carry talons 17, 18 engaged in grooves 19, 20.

Figure 2:
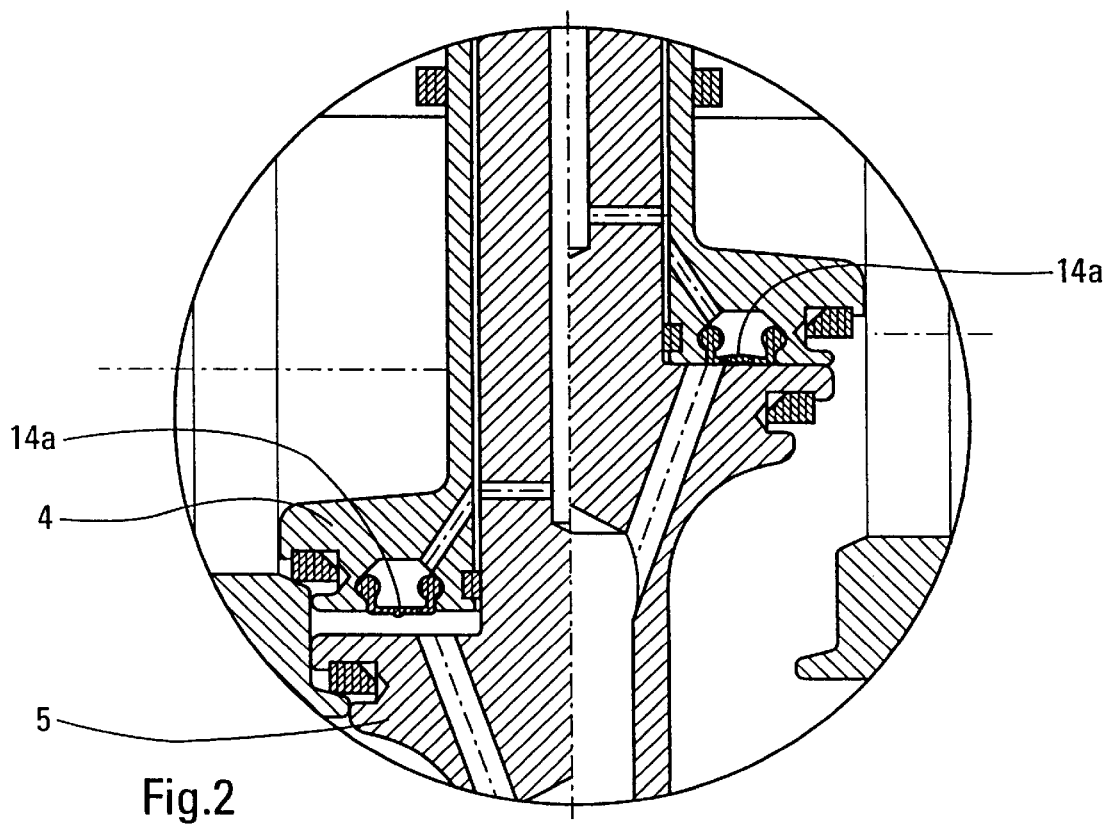
FIG. 2 is a partial view in axial section showing a second version of the inflatable membrane.

In the example shown in FIGS. 1 and 2, the two ends of the membrane 14, 14a are fixed to the top closure 4.

In the FIG. 1 example, one talon 18 of the membrane 14 forms a seal between the swing 10 of the top closure 4 and the swing 11 of the bottom closure 5.

Figure 3:
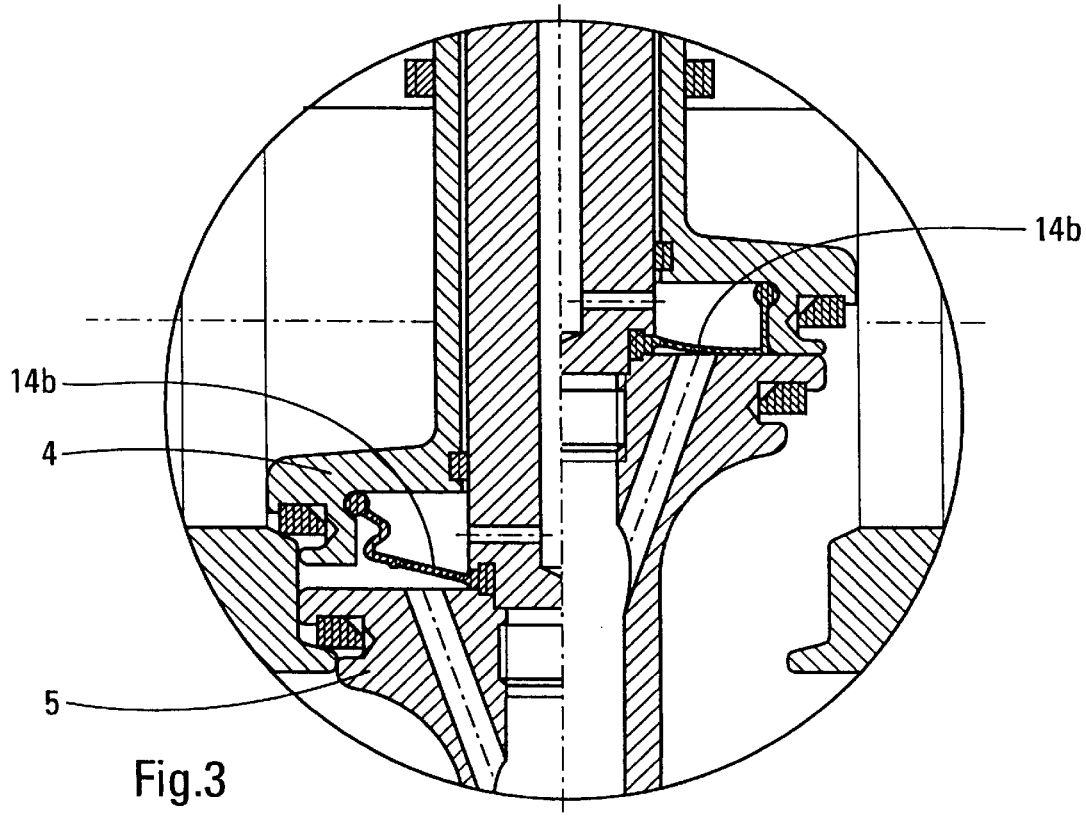
FIG. 3 is a partial view in axial section showing a third version of the inflatable membrane.
Figure 4:
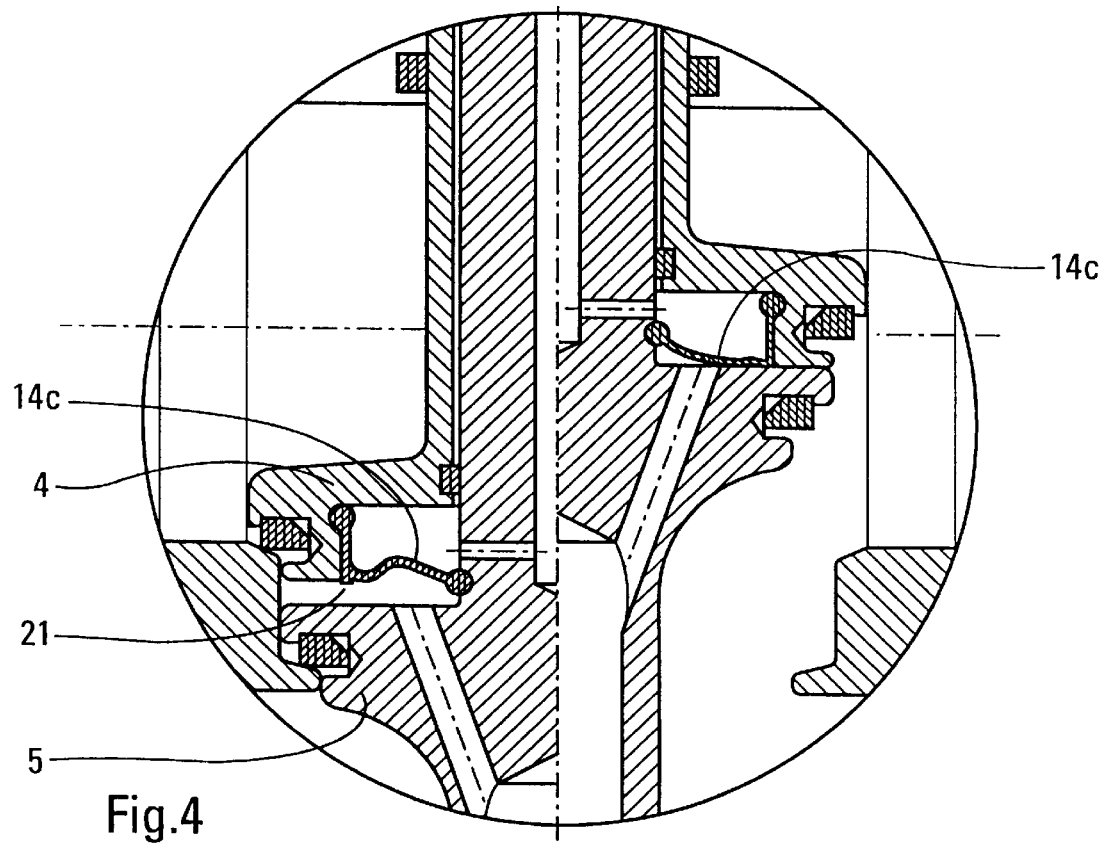
FIG. 4 is a partial view in axial section showing a fourth version of the inflatable membrane.
Figure 5:
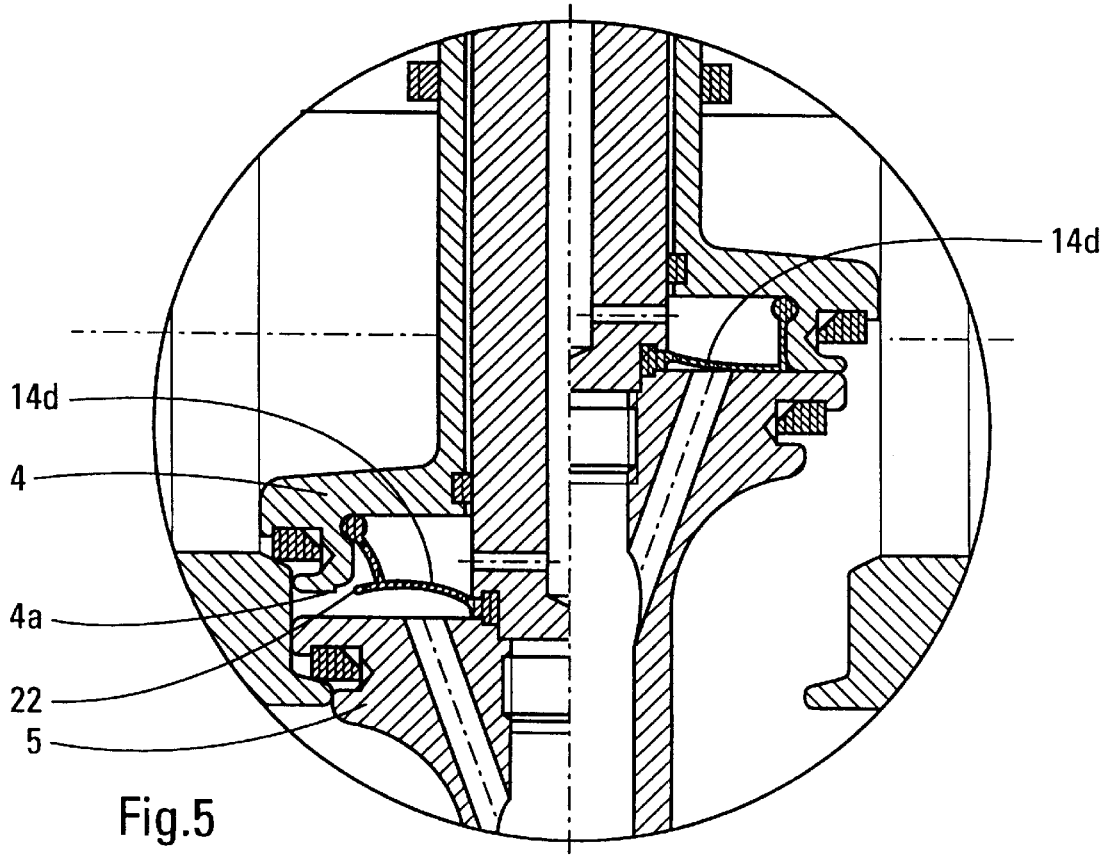
FIG. 5 is a partial view in section showing a fifth version of the inflatable membrane.

In the examples shown in FIGS. 3, 4, 5, one end of the membrane 14b, 14c, 14d is fixed to the swing 11 of the bottom closure 5 near its top surface.

In the FIG. 4 example, the membrane 14c includes a bead 21 bearing on the top surface of the bottom closure 5 when the membrane 14c is inflated by the compressed air.

In the FIG. 5 example, the bead 22 is adapted to be inserted in sealed fashion between the bottom edge 4a of the top closure 4 and the top edge of the bottom closure 5 when the membrane 14d is inflated by the compressed air.

FIG. 1 also shows that the compressed air feed 16 that discharges into the chamber 15 closed by the membrane 14 is connected to an axial passage 16a in the swing 11 of the bottom closure 5.

The closures 4, 5 are held in the closed position bearing on their corresponding seat 6, 7 by springs 23, 24 bearing on the top ends of the swings 10, 11 of the closures 4, 5.

The top end of the swing 11 of the bottom closure carries a piston 25 mobile in a cylindrical chamber 26.

A compressed air feed 27 is provided in a space 28 under the piston 25 to move it towards the open position of the closures 4, 5.

FIG. 1 also shows that the axial passage 16a in the swing 11 of the bottom closure 5 discharges at the top end of that swing into the space 28 into which the compressed air feed 27 discharges.

Accordingly, when the compressed air moves the piston 25 toward the open position of the closures 4, 5, compressed air enters the passage 16a and then the chamber 15 and inflates the membrane 14.

The operation of the valve just described will now be explained.

Compressed air is injected via the opening 25 that discharges into the space 28 to open the closures 4, 5.

The compressed air moves the piston 25 against the action of the spring 23. The piston 25 entrains the swing 11 of the bottom closure 5. The spring 24 causes the swing 10 and the corresponding closure 4 to follow the movement of the swing 11 and the closure 5.

Compressed air injected into the space 28 enters the radial passage 16b and then the passage 16a that discharges into the chamber 15 via the conduit 16.

As it fills the chamber 15, the compressed air inflates the membrane 14, which is therefore pressed in a sealed fashion onto the top surface of the bottom closure 5.

No product can therefore leak via the passage 12 during movement of the closures 4, 5 toward their open position.

The closures 4, 5 can be lifted off their seat 6, 7 to clean the seals of the closures.

Accordingly, to lift the bottom closure 5, it is sufficient to blow compressed air into the opening 29 which moves the piston 30 which entrains the swing 11 of the closure 5.

Accordingly, to lift the top closure 4, it is sufficient to blow compressed air into the opening 31 which moves the piston 32 which entrains the swing 10 of the closure 4.

Figure 6:
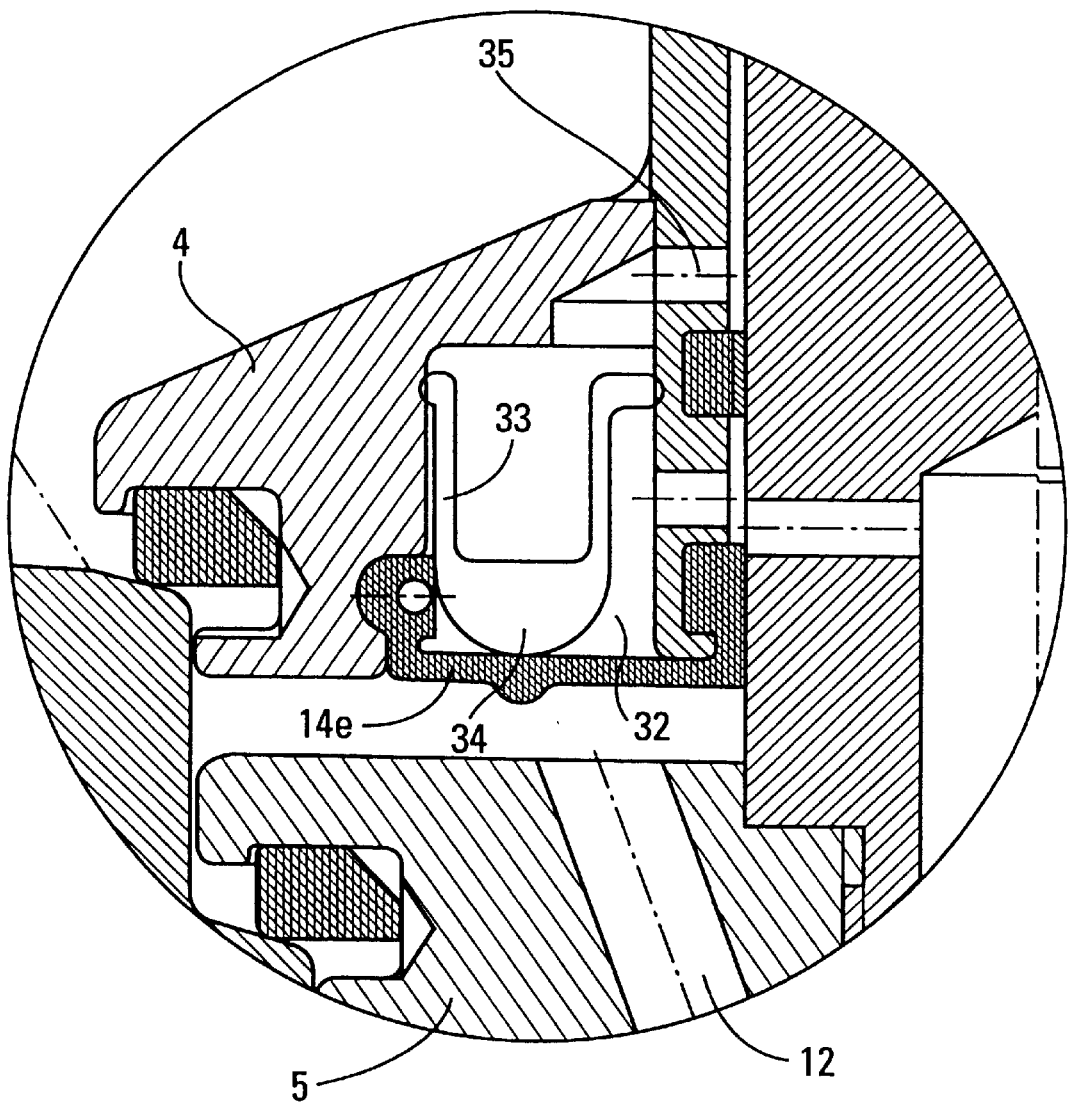
FIG. 6 is a partial view in section of a version of the valve in accordance with the invention equipped with an elastic membrane loaded by a piston.

In the FIG. 6 embodiment, the chamber 32 is closed by an elastic membrane 16e. A piston 33 slides in the chamber 32 and one end 34 of the piston is in contact with the elastic membrane 16e.

The compressed air feed 35 discharges into the end of the chamber 32 opposite the membrane 16e.

As shown in FIG. 6, the piston 33 is substantially U-shaped in section, the base 34 of the U-shape being in contact with the membrane 14e through a rounded surface which in the example shown is spherical.

The piston 33 is preferably made of polytetrafluorethylene.

The operation of the valve shown in FIG. 6 is identical to that of the valve shown in FIG. 1.

When the closures 4, 5 are opened, compressed air reaches the chamber 32. However, instead of acting directly on the membrane 14e, the compressed air moves the piston 33 which deforms the membrane 14e by pushing it toward the closure 5.

Because of its shape, the piston 33 acts as a pressure multiplier, applying to the membrane 14e a pressure greater than that in the chamber 32 in the absence of the piston 33.

This improves the seal between the closures 4 and 5.

Of course, the invention is not limited to the example just described to which many modifications can be made without departing from the scope of the invention.

What is claimed is:

1. A valve comprising a body including a first chamber communicating with two lateral conduits, a bottom closure having a first surface; a top closure having a second surface oriented generally perpendicular to said first surface of said bottom closure, said top and bottom closures being capable of independent movement in said firs chamber along a common axis perpendicular to said two lateral conduits, wherein a lower part of said chamber includes a first seat for said top closure and a second seat for said bottom closure below said first seat, said valve body incorporates a second chamber under said first and second seats and into which a third conduit discharges; said top and bottom closures are each carried by mobile members being capable of rectilinear movement along said common axis between a position in which said top and bottom closures bear in a sealed manner on their corresponding seat and a position in which said top and bottom closures are spaced from said seats, said mobile member of said bottom closure defines an internal passage that discharges into a space defined by said top and bottom closures; and said space contains an elastic membrane defining a second chamber into which a compressed fluid discharges so that said elastic membrane can be inflated and applied in a sealed fashion to said first surface of said bottom closure and said second surface of said top closure, wherein said elastic membrane functions to seal against said first and second surfaces to close and seal said inlet of said internal passage when said top and bottom closures are engaged with each other and disengaged from said first and second seats.

2. The valve claimed in claim 1 wherein said second chamber closed by said elastic membrane is partially defined by a bottom surface of said top closure and at least one end of said elastic membrane is fixed to said top closure.

3. The valve claimed in claim 2 wherein said elastic membrane carry beads engaged in grooves defined by said closures.

4. The valve claimed in claim 2 wherein two ends of said elastic membrane are fixed to said top closure.

5. The valve claimed in claim 3 wherein one bead of said elastic membrane forms a seal between said mobile member of said top closure and said mobile member of said bottom closure.

6. The valve claimed in claim 2 wherein one end of said elastic membrane is fixed to said mobile member of said bottom closure near said first surface.

7. The valve claimed in claim 6 wherein said elastic membrane incorporates a second bead adapter to bear on said first surface of said bottom closure when said elastic membrane is inflated by compressed air.

8. The valve claimed in claim 7 wherein said second bead is adapted to be inserted in sealed fashion between a bottom edge of said top closure and a top edge of said bottom closure when said membrane is inflated by compressed air.

9. The valve claimed in claim 1 wherein said compressed fluid discharges into said second chamber closed by said elastic membrane is supplied through an axial passage in said of said mobile member bottom closure.

10. The valve claimed in claim 9 wherein said closures are held in a close position bearing on the corresponding seat by springs bearing on the top ends of said mobile members of said closures, said top end of said mobile members of said bottom closure carries a piston in a cylindrical chamber an a compressed fluid is provided in a space under said piston to move said closures to an open position.

11. The valve claimed in claim 10 wherein said axial passage in said mobile member of said bottom closure discharges at said top end of said mobile member into said space into which said compressed fluid discharges so that when compressed fluid moves toward said open position of said closures said compressed fluid enters said axial passage and then said second chamber and inflates said elastic membrane.

12. The valve claimed in claim 1 wherein said second chamber contains a sliding piston one end of which is in contact with said elastic membrane and said compressed fluid discharges at the end of said second chamber opposite said elastic membrane.

13. The valve claimed in claim 12 wherein said piston has a substantially U-shaped section and the base of the U-shape is in contact with said elastic membrane.

14. The valve claimed in claim 12 wherein the end of said piston in contact with said elastic membrane is rounded.

15. The valve claimed in claim 12 wherein said piston is made of polytetrafluorethylene.

* * * * *